United States Patent [19]
DeLattre et al.

[11] Patent Number: 5,797,417
[45] Date of Patent: Aug. 25, 1998

[54] ELECTRIC DEVICE FOR MANAGING OVER TIME THE OPERATION OF ELECTROVALVES

[76] Inventors: Sylvain DeLattre, 304 Chemin du Bellet, 06200 Nice; Gilles DeLattre, Le Fragonard 6 Bd Kennedy, 06800 Cagnes sur Mer, both of France

[21] Appl. No.: 533,999

[22] Filed: Sep. 27, 1995

[30] Foreign Application Priority Data

Sep. 27, 1995 [FR] France .................... 94 11773

[51] Int. Cl.$^6$ .................................... A01G 25/16
[52] U.S. Cl. .................... 137/78.3; 137/624.12; 251/129.04; 251/291; 239/69
[58] Field of Search .............. 137/78.3, 624.12; 239/69; 251/129.04, 291

[56] References Cited

U.S. PATENT DOCUMENTS

| | | |
|---|---|---|
| 4,378,027 | 3/1983 | Weirich et al. . |
| 4,760,547 | 7/1988 | Duxbury . |
| 5,060,859 | 10/1991 | Bancroft ............... 137/78.3 |
| 5,074,468 | 12/1991 | Yamamoto et al. . |
| 5,173,855 | 12/1992 | Nielsen et al. . |
| 5,326,027 | 7/1994 | Sulfstede . |
| 5,341,831 | 8/1994 | Zur ....................... 137/78.3 |
| 5,546,974 | 8/1996 | Bireley ................. 137/78.3 |

*Primary Examiner*—A. Michael Chambers
*Attorney, Agent, or Firm*—F. A. Sirr; E. C. Hancock; Holland & Hart LLP

[57] ABSTRACT

A valve-automatic-pilot couples to electrovalves that control a watering cycle.

The automatic-pilot includes a U-shaped magnetic circuit having two vertically spaced, parallel, and horizontally extending legs. The upper leg of the magnetic circuit carries a permanent magnet. An electrical coil is mounted between the two legs of the magnet circuit with a bottom of the coil abutting the lower leg of the magnetic circuit, with the top of the coil spaced from the top leg of the magnetic circuit, and with an open central axis of the coil extending vertically. A vertically movable retaining block is internal of the coil and is spring biased downward to a valve-closed position. When the block is in its valve-closed and first bistable position, a large air gap prevents the magnet from moving the block upward to its valve-open position. A momentary pulse of coil-current of one polarity moves the block upward to its valve-open and second bistable position. With a small air gap now existing, the magnet holds the block in valve-open position. In order to close the electrovalve a momentary coil-current of an opposite polarity enables the spring to restore the block to its lower valve-closed position. On-site manual operation/programming and remote wireless operation/programming are provided

18 Claims, 3 Drawing Sheets

ELECTRIC DEVICE FOR MANAGING OVER TIME THE OPERATION OF ELECTROVALVES

The present invention relates to the control of electrovalves. It comprises two main parts:

On one hand a valve automatic pilot enabling the management over time of the operation of electrovalves. It is immovably attached to the electrovalve and can receive, store, reproduce and interpret the information coming from external sources or produced manually on the device or generated by itself. The valve automatic pilot must act on the opening and closing of hydraulic electrovalves, pneumatic electrovalves, needle electrovalves, membrane electrovalves and all other kinds of electrovalves.

On the other hand various devices for the management and control of the partial or complete programming of one or more valve automatic pilots by means of electric, optoelectronic links, electromagnetic or radio electric waves. In the case of the management of several electrovalves, our devices allow for all the possibilities of avoiding or favouring the simultaneous operation of certain ones among them or all of them on one single network or on distinct networks.

As an example, and without prejudging other applications, the invention which will be described further on in relates to an installation for irrigation. Any usage of the invention in a field other than that described is also within the scope of this patent.

In most installations for automatic irrigation, the programmer is located in a room and controls, either 24V (or other voltages) electrovalves located near the zones to be irrigated by the wire method (electric piloting), or pilot electrovalves (near the programmer), the latter controlling hydraulic electrovalves, sometimes placed at a considerable distance away in the fields, by way of tubing (hydraulic piloting).

Electrovalves programmable on the site have appeared on the market. These ones are isolated, independent and suppose the existence of an electronic control beside the solenoid with or without the possibility of correlation between them.

Up to date, no electrovalve exists that is programmable on the site and capable of combining the advantages of traditional programming and those of electrovalves programmable on the site. For this new type of apparatus, we aimed at creating or integrating all the types of functionalities, or possibilities of control nearby or remote, to make them as dependable as possible owing to the regrouping of the memories, organs of automatic command, securities and manual functions within the solenoid, and in general to use all the performances which can allow them to be controlled by their regrouping or separation one from the other as with wire or hydraulic programming.

These innovations allow a more complete and sure approach to the problems related to the programming of electrovalves, and answer much better the multitude of requirements of the installations, whether they be small, large or complex, owing to their greater flexibility.

The invention thus consists in recreating and improving the general principles of the former wire or hydraulic programming (flexibility, numerous possibilities of correlations, centralisation of the control, of the management, of the supply) in an electric programming device on the site of electrovalves. Our solution thus allows the control of groups of electrovalves with more dependability and a far lower cost. The invention is characterized by:

on one hand an valve automatic pilot, solidly attached to the electrovalve, containing a bistable solenoid, and all the electric and electronic equipment necessary for its operation autonomous in its possibilities of site and distance remote programming intelligent, because capable of adapting to various unpredictable situations by means of incorporated security devices and external information and regulation devices, dependent or independent in a managing system of a group of automatic pilots of homologous electrovalves.

on the other hand a set of remote controls capable of participating in the management of the operation of one or more valve automatic pilots by any means capable of conveying a coded information.

Thus, the valve automatic pilot is characterized by:

the fact that it includes an electric power supply system, a bistable solenoid, an electric control circuit, a microprocessor, a clock, a device for its control and for visualization of its operation and for the on-site programming: "manual", "stop", "automatic" cycle while ensuring the duration, the periodicity of the electrovalve operation and also the setting for its "temporary halt" without touching the programming, the internal sensors of security and of regulation and two bi-directional communication interfaces towards both the instruments of remote control and the external sensors of security and of regulation performed electrically, optoelectronically, by electromagnetic or radio electric waves.

the quality of the magnetic circuit obtained by placing the permanent magnet in the inscribed volume of the magnetic circuit as well as by the two air-gaps linked to the operation cycle of the bistable solenoid: When a retaining block is in the high position (opened electrovalve), the magnetic circuit includes a single air-gap thus facilitating the passage of the magnetic flux generated by the permanent magnet. When the retaining block is in the low position (closed electrovalve), the magnetic circuit then includes 2 air-gaps annihilating almost totally the attraction of the retaining block by the permanent magnet.

its spontaneous magnetic fixation on the electrovalve thanks to a permanent magnet.

a sensor of the retaining block position in the bistable solenoid which serves to indicate any immoderate deviation to the electronic circuit, its detection being carried out by means of an electromagnetic, optic, mechanical or electric sensor.

a sensor of the supply voltage analyzing the state of the electric power supply by the intermediary of the electric and electronic circuits therein, and when this voltage falls below a defined level, it orders the retaining block to be pushed back to the low position (closed electrovalve) as the last possible action. In the same way, the automatic electrovalve pilot becomes functional again at a determined level of voltage.

The totality of the set of remote controls is characterized by several remote controls which differ one from another by more or less advanced performances for the coded transmission and reception of a number of more or less complete parameters of operation towards valve automatic pilots. The means of communication between this set and the remote valve automatic pilots is infrared according to the code RC5 or any other. This family of remote controls comprises among others:

A simplified remote control, capable of acting only on the "manual" mode of the pilot: On-Off or Off-On without being able to modify the parameters of the program incorporated in the pilot. It includes a keyboard, a control light, a transmitter of coded information.

A programming remote control bearing a keyboard, a control light, a transmitter of coded information able to carry out the operations of the simplified remote control and as well to transmit certain programming data to the valve automatic pilots and to identify them by coding and decoding.

A portable console including a screen, a keyboard, a light, a microprocessor connected to a clock and a memory and two bi-directional communication interfaces. The first conveys coded information towards the valve automatic pilots, the second towards a control centre, by any means capable of conveying coded information. This console makes it possible to use the totality of the characteristics of the valve automatic pilot as well as those of the two remote controls previously described.

Like the programming remote control, the portable console makes it possible to communicate with the valve automatic pilots, to code or not to code them, to decode them, but it also enables information from these to be collected, enables them to be rendered dependent or independent, prevents from pirating their programming by other remote control means, the constructing of a programme for the management of a group of automatic electrovalve-pilots located in the same network or in distinct networks. It also allows bi-directional communication with a management centre by RS232 coding or any other method of coding of all or part of the information transmitted or gathered from the valve automatic pilots.

The attached figures illustrate the invention schematically:

Valve automatic pilot

Figure 1:
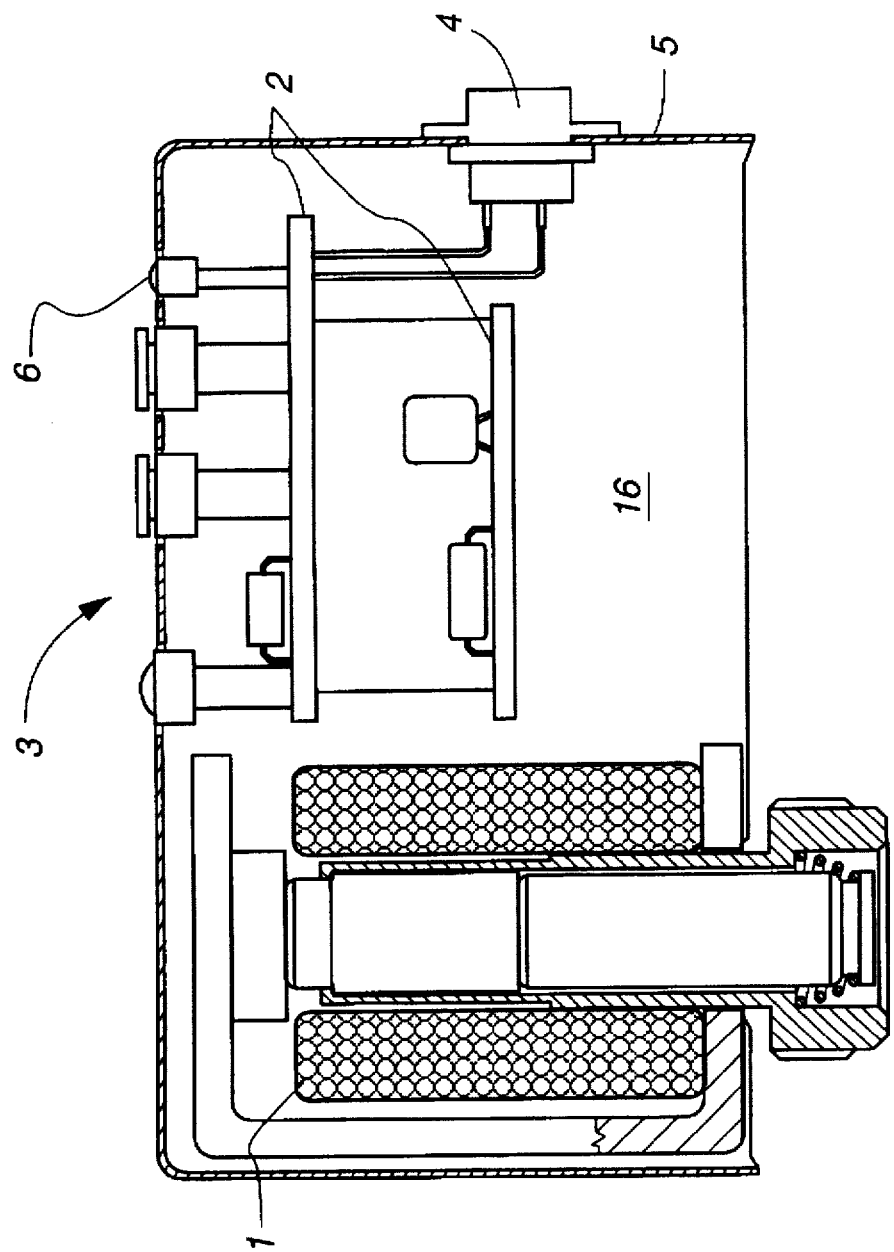
FIG. 1 represents a section of the principal parts constituting a valve automatic pilot.

The valve automatic pilot schematically represented in FIG. 1 comprises principally a solenoid with bistable pulses (1), an electronic circuit (2), a device for the on-site operation and programming control (3), links to the exterior (4) (communication interface, electric supply-system, . . . ) and an exterior envelope (5). All of these elements will be described in the following paragraphs.

The solenoid with bistable pulses (1)

Figure 2:
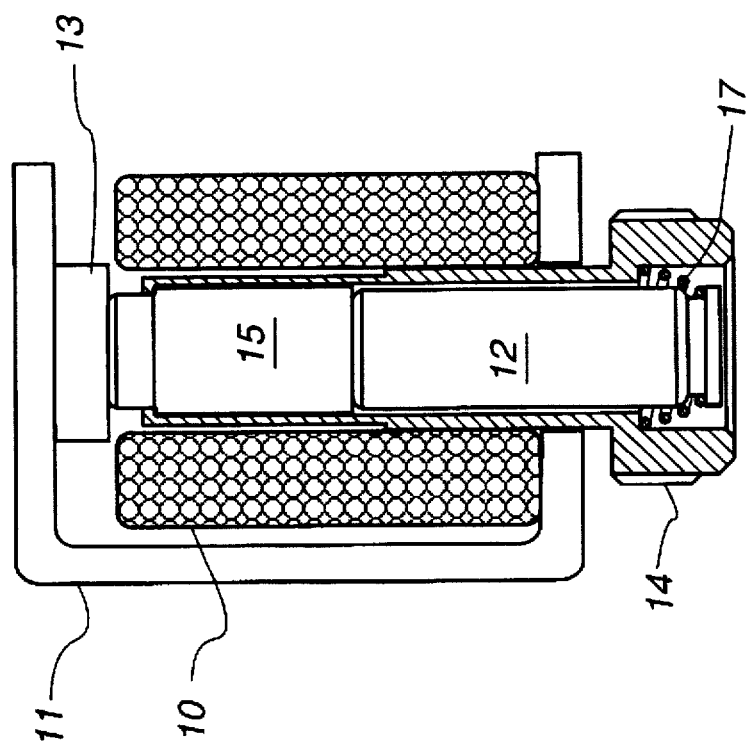
FIG. 2 represents a section of the bistable solenoid.

The solenoid with bistable pulses, detailed in FIG. 2, includes an electromagnetic coil (10), an exterior magnetic circuit (11), a permanent magnet (13), various parts serving to concentrate and transmit the flow onto the axis of the coil and a retaining block (12) which can translate parallel to this axis in a guide (14).

The magnetic circuit includes a metallic part (11) of stainless steel type F17 or of plain steel and more generally any plain magnetic material (capable of conducting a magnetic field without residual magnetism) encircling the coil to channel and facilitate the transmission of the field from one pole to the other thereof, a permanent magnet (13) which will serve as flux generator and the parts (12) and (15) conducting the magnetic field on the axis of the coil, these ones being also made of a plain magnetic material.

Cycle of operation of the bistable solenoid

When the retaining block 12 is in the low position (closed electrovalve), the magnetic circuit is open (air-gap of several millimeters between the parts (15) and (12) which is sufficient to stop the passage of the flux). On the contrary, when the retaining block is in the high position (opened electrovalve), the magnetic circuit is closed and the retaining block (12) is attracted against the part (15), then the magnet (13).

Thus, with the magnetic circuit opened, current must be sent for a little time into the coil with a polarity which will generate an oriented magnetic field capable of attracting the retaining block 12, of compressing the spring (17) and again closing the magnetic circuit described above. When the magnetic circuit is closed, the retaining block (12) will remain in the high position, even in the absence of the current applied to the coil.

To open the magnetic circuit, it is sufficient to send a current with an inverse polarity into the coil 10, which will generate a magnetic field capable of sending the retaining block (12) away from the permanent magnet (13) by the intermediary of the part (15). The reminder spring 17 exerts a sufficient force to keep the retaining block 12 away in the low position, in the absence of current.

The quality of the magnetic circuit obtained by arranging the permanent magnet in the position represented in FIG. 2 constitutes the main interest of this solenoid with bistable pulses: all the magnetic induction proper to the magnet is used in the magnetic circuit with the lowest losses. When the retaining block (12) is in the high position, the solenoid no longer includes more than a single air-gap between the parts (11) and (12). When the retaining block is in the low position, the solenoid includes two air-gaps, between (11) and (12) and between (12) and (15).

Part (14) serves not only as a guide for the retaining block, but also as a part for the adaptation of the various kinds of electrovalves. Each family of electrovalves on the market or nearly so has a type of solenoid in which the retaining block, the diameter, the wiring are specific. Thus, our system allows the user to install the valve automatic pilot on most of the electrovalves of the market by removing the original solenoid, screwing on the appropriate part (14), and fitting in the device.

Part (14) is screwed on the body of the electrovalve and allows the retaining block 12 to develop in a waterproof cavity. The pilot is rendered interdependent with the electrovalve by magnetization: attraction of (15), with the magnet (13). Its positioning is performed by centering (14) on (10). This technological solution has the advantage of simplifying the fixation, of being able to place or remove the valve automatic pilot rapidly.

The electronic circuit (2)

The electronic circuit 2 contains a microprocessor associated to a memory, a clock, an instrument for the on-site programming and control of operation, a transmitter-receiver for remote control, a power circuit to allow control of the solenoid, remote programming interfaces towards security and regulation sensors.

The manual programming and operation control device (3) is composed of a keyboard and control lights which allow the direct control of the valve automatic pilot without having to use a console, a remote control or any other means of remote control. It is possible, for example, thanks to the keyboard, to introduce into the automatic pilot the periodicity and the cycle of watering. The user can also decide to stop for a time the operation of the pilot (seasonally, during the winter, for example). The lights permit a visualization of the state of the valve automatic pilot: problems concerning the battery, the manual or automatic working, the period of watering, . . .

The power circuit amplifies the control signals of the microprocessor and furnishes the positive or negative pulses for the supply of the bistable coil 10.

The bidirectional remote programming interface allows communication with all the means of programming described below in this patent. Transmission between the exterior instruments of programming and the valve automatic pilot is performed by infrared, coded according to RC5 or any other coding, or any other electromagnetic or wiring medium.

The bi-directional communication interface towards the security and regulation sensors allows the reception of the information furnished by the interior and exterior sensors, their analysis and action on the running of the program. The links towards the exterior sensors are allowed for by all available wiring or electromagnetic means, coded or not.

An internal sensor of voltage is arranged to analyze the state of the electric source relative to a reference. Below a minimal level of voltage (first internal order), the residual electric source can be used to slacken off the valve automatic pilot and to open the magnetic circuit as a last possible action. It will not start operation again until the voltage has again become sufficient (second internal order).

The sensor of position of the retaining block (12) makes it possible to ensure a convenient position of this part in the coil, therefore of abnormal movements it might be subjected to (turbulence, etc.), and to react to any problems. The uncertainty of its real position in a bistable coil (high position or low position) for various reasons demonstrates the interest of this innovation. Thanks to this sensor using any electromagnetic, optical, mechanical or electric principle, and after analysis, it is possible at any time to re-establish the normal position of the part (12).

Waterproof links towards the exterior (4).

Links 4 between the valve automatic pilot and the exterior have been provided for. Indeed, the pilot can include sensors which must be arranged in locations representative of the measurements to be collected. The sensors can be of humidity, of temperature, of voltage, of wind-speed, of rate of flux, of passage of fluid, . . . The microprocessor is programmed to analyze the signals sent by the analogical or binary sensors and to react if necessary. Thus, the links between these sensors and the valve automatic pilot are performed by waterproof fixed or removable connections.

In the case where the power is supplied by battery or accumulator, the source of the current is arranged outside the envelope (5) or in a waterproof tank and a waterproof connection is furnished between the latter and the valve automatic pilot.

The waterproof envelope (5) and the resin (16)

The waterproof envelope of the valve automatic pilot is made by injection or by other process of a plastic material which can remain flexible at normal temperatures at which it is used (about −15° C. to 60° C. or more for particular applications). The interior of the waterproof envelope (5) of the valve automatic pilot is filled with a waterproof resin (16) which isolates all the parts it contains. This resin prevents any contact between the parts constituting the valve automatic pilot and the exterior environment. It is constituted of a material capable of absorbing the swellings of the envelope in such a way as to remain solidly attached to the latter.

The transmitter-receiver for cordless control (6)

The inventors chose infrared as a means of communication between the instruments of management, of remote control, of programming and the valve automatic pilot. The infrared transmitter-receiver is placed on the upper part of the envelope (5). Thus, the user can program his valve automatic pilot(s) with ease.

When several valve automatic pilots are located in proximity, it is possible to code each of them separately to avoid any error during the transmission of remote orders.

Power supply (7).

The inventors have envisaged the use of several possible sources of power supply.

The first uses a battery which is sufficient to furnish the current necessary for the operation of the valve automatic pilot.

The second uses an accumulator, a solar panel and a charge-circuit. The solar panel is either fixed on the valve automatic pilot or put in a suitable place.

Finally, any source allowing the charging of an accumulator by any energy other than solar: wind for example.

The valve automatic pilot also includes a mechanism which cuts the power supply to the bistable solenoid when the battery or the accumulator has lost too much of its charge.

Set of management and remote control of the valve automatic pilot programming and operation.

The set of management and of remote control of the valve automatic pilot programming and operation is constituted by several modules with more or less sophisticated performances. They use infrared as means of communication with RC5 coding or any other. This set illustrated in FIG. 3 includes among other things:

A simplified remote control (18).

A programming remote control (19).

A programming console (20).

The simplified remote control (18).

It is constituted by a small-sized waterproof case, a power supply, an infrared transmitter of coded information according to the RC5 coding or another, a keyboard and a control light.

It allows the "manual" operation of the valve automatic pilots. In "manual", it is necessary to touch a key of the remote control to open the electrovalve, to touch a key to close it after the desired time. This action in no way perturbs the programming of the cycle durations and periods of watering recorded in the microprocessor of the valve automatic pilot. It does allow the user to check the hydraulic operation of the network controlled by the electrovalve, to furnish selectively a complement of water and to be sure of the state of the batteries in the pilot.

The programming remote control (19).

This remote control is designed on the same principle as the television, video, CDI, . . . remote control. Like these, it uses an RC5 or other coding system and standard keys and control lights.

This remote control makes it possible to activate "manually" a valve automatic pilot such as the simplified remote control, but also to program the duration of "automatic" watering for example from 1 to 99 min by using the possibility of codification of the pilot if necessary, and to program the period of the watering cycles. Thus, by choosing, for example, 12h, the valve automatic pilot will activate the electrovalve every twelve hours during the period programmed.

Figure 3:
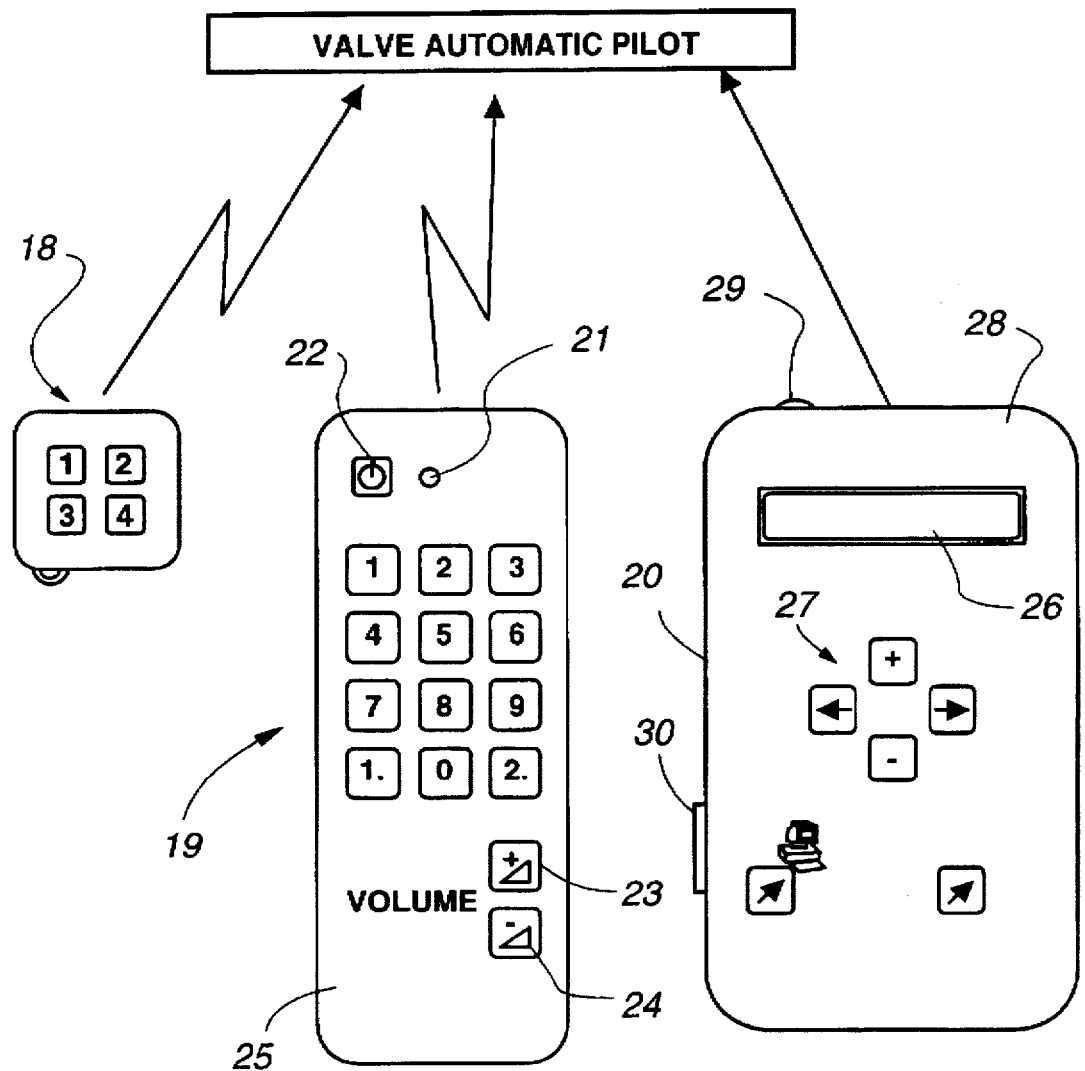
FIG. 3 represents a non-limited set of remote controls of the valve automatic pilot.

The programming remote control schematized in FIG. 3 includes a control light (21), a digital keyboard, keys with standardized graphics slacken off (22), sound slacken off, volume+(23), volume−(24), . . . ) power supply by batteries, and a waterproof case unaffected by ejection of water (25). To program the duration and the period, the inventors have chosen the use of keys the most representative of these functions. Thus, the keys "Volume +" and "Volume −" are reserved for the period because one augments or reduces the volume of the water brought to the soil.

The totality of the possibilities of programming offered by this remote control has been limited voluntarily so as to remain simple and accessible to non-professional users. The inventors have nevertheless envisaged the transmission by this remote control of more sophisticated functions and reserve the right to develop these.

The programming console (20).

This means of programming is that which makes it possible to use remotely all the capacities of valve automatic pilots. It is destined for the installations in which the operation of electrovalves is linked or not (park and gardens type: no overlapping, sequential operation, . . . ), for those persons who have one or more sets of valve automatic pilots to manage (installers, municipalities), for agriculture-type installations in which the durations, periods and overlapping of opening of watering electrovalves, of fertilization, of spraying, of washing of the filters, . . . are specific for each operation.

Like the two other remote controls previously described, the programming console schematically represented in FIG. 3 allows the introduction of programming data into each of the valve automatic pilots, the coding or decoding of each pilot, "manual" operation or stopping, but as well, thanks to a screen, a microprocessor associated to a clock, the composition of sequences of a certain number of pilots operation as a chain or simultaneously within a single hydraulic network or several networks.

It principally comprises a screen (26) or other system of visualization, a keyboard (27), a waterproof tank (28), an autonomous power supply, an electronic circuit and communication interfaces (29) and (30). The first interface transmits and receives coded information from the valve automatic pilots, the second makes it possible to communicate with a control centre by the intermediary of a transmitter-receiver using any means capable of conveying a coded information. Other types of input-output of information, such as vocal synthesis, can be envisaged.

Among all the possible means of communication of coded information (by electric, optoelectronic way, electromagnetic or radio electric waves), the use of infrared for linking the console to the valve automatic pilots and the connection wires between the console and the control centre has been envisaged. As a means of coding, the use of RC5 or any other for the first linking-up and RS232 or any other one for the second has been envisaged. The reason for choosing RC5 coding has already been explained and where RS232 is concerned, this is commonly used to transfer coded information from a microcomputer which most often serves as control centre.

Said control centre permits a temporary analysis of the operation of the installation(s) including one or more valve automatic pilots. It is possible to record, compare, analyse data coming from the console and from exterior sensors (meteorology). The interest of this solution is that the user can control his valve automatic pilots from a control-post far more efficiently than with a traditional programmer because he can integrate numerous other parameters in his analysis.

The console and the control centre include an internal clock which will serve as reference for all valve automatic pilots including partial or total program changes of the latter. Thus, the user must program the operation of the electrovalves on the console or on the control centre, transfer to each valve automatic pilot the information which concerns it and pass on to the next. The valve automatic pilot thus becomes autonomous. In the case of solar power supply, this autonomy is theoretically unlimited. The information transmitted is thus: coding for identification, the time-base, the hour, the duration and the period of operation, the authorization to use the other remote controls or not, . . .

The communication between the valve automatic pilots and the console can be bi-directional. Indeed, the latter— like all the other remote controls—transmits parameters to each valve automatic pilot, the latter records them and executes them. It is envisaged, however, that the console (20) may gather the information on the valve automatic pilots concerning their operation over time, their possible breakdowns, . . . to transmit it to the control centre.

One of the interests of this characteristic is the possibility of transmitting to the user any problems that may arise, of precisely monitoring the volumes of water, of fertilizer furnished to the plants, etc..

We claim:

1. An automatic pilot for managing over time the operation of an associated valve by way of on-site or remote control of said automatic pilot, said automatic pilot comprising:

a coupling for physically attaching said automatic pilot in operative relation to an associated fluid flow control valve;

a solenoid having a bistable actuator movable between a stable valve-closed position and a stable valve-open position, for respectively closing and opening the associated valve;

a permanent magnet associated with said actuator for biasing said actuator to one of said stable positions;

circuit means including a coil associated with said actuator and operative upon energization of said coil to overcome said biasing of said actuator by said magnet, whereupon said actuator assumes the other of said stable positions;

first means enabling an on-site control input to said circuit means; and second means enabling a remote control input to said circuit means from a remote location.

2. The automatic pilot of claim 1 including:

a receiver connected to said circuit means; and a communication interface adapted to couple said receiver to a remote control by means of electromagnetic waves.

3. The automatic pilot of claim 1 wherein said electromagnetic waves are coded electromagnetic waves.

4. The automatic pilot of claim 1 wherein said one of said stable positions is a valve-closed position, and wherein said other of said stable positions is said valve-open position.

5. The automatic pilot of claim 4 including safety means operable to force said bistable actuator to said valve-closed position upon detection of a failure.

6. In a watering system having a plurality of water-flow control valves, a plurality of automatic pilots, one for each of the flow control valves, each of said automatic pilots comprising:

a coupling for physically attaching said automatic pilot in controlling relation to an associated valve;

a bistable actuator movable between a stable valve-closed position and a stable valve-open position, for respectively closing and opening the associated valve;

magnetic force means associated with said actuator for force biasing said actuator to one of said stable positions;

circuit means including an electrically energizable coil associated with said actuator, said coil being operative upon energization thereof to overcome said biasing of said actuator by said magnetic force means, whereupon said actuator assumes the other of said stable positions;

first means enabling an on-site control input to said circuit means; and second means enabling a remote control input to said circuit means from a remote location by operation of electromagnetic waves.

7. The watering system of claim 6 wherein said coupling is a generally universal coupling.

8. The watering system of claim 6 wherein a plurality of electromagnetic waves are individually coded to a unique one of said plurality of automatic pilots.

9. The watering system of claim 6 wherein said magnetic force means is a permanent magnet.

10. The watering system of claim 6 wherein each of said automatic pilots includes on-site means and remote means for controlling a time duration and a frequency for effecting a watering interval.

11. The watering system of claim 10 including a remote control having a manually operable keyboard and a human readable screen enabling said remote control of said time duration and said frequency for effecting a watering interval.

12. The watering system of claim 6 wherein said coil is pulse-energized to overcome said biasing of said actuator by said magnetic force means.

13. An automatic pilot for managing the operation of an associated flow control valve by way of on-site control or by way of remote control of said automatic pilot, said automatic pilot comprising:

a coupling for physically attaching said automatic pilot in operative relation to an associated fluid flow control valve;

a solenoid having a bistable actuator movable between a stable valve-closed position and a stable valve-open position, for respectively closing and opening the associated valve;

a permanent magnet associated with said actuator for biasing said actuator to said valve-closed position;

circuit means including a coil associated with said actuator and operative upon pulse-energization of said coil to overcome said biasing of said actuator by said permanent magnet, thereby causing said actuator to assume said valve-closed position;

first means connected to said circuit means enabling on-site control input to said circuit means;

second means including a receiver connected to said circuit means enabling a control input to said circuit means from a remote location; and a communication interface adapted to couple said receiver to a manually operable remote control means by way of coded electromagnetic waves.

14. In a watering system having a plurality of water-flow control valves, a plurality of automatic pilots, one automatic pilot for each of the flow control valves, each of said automatic pilots comprising:

a generally universal coupling for physically attaching said automatic pilot in controlling relation to an associated valve;

a bistable actuator movable between a stable valve-closed position and a stable valve-open position, for respectively closing and opening the associated valve;

permanent-magnetic force means associated with said actuator for force biasing said actuator to one of said stable positions;

circuit means including an electrically energizable coil associated with said actuator, said coil being operative upon pulse-energization thereof to overcome said biasing of said actuator by said magnetic force means, whereupon said actuator assumes the other of said stable positions;

first means enabling an on-site control input to said circuit means;

second means enabling a remote control input to said circuit means from a remote location by operation of electromagnetic waves that are individual coded to a unique one of said plurality of automatic pilots; and on-site means and remote means for controlling a time duration and a frequency for effecting a watering interval.

15. The watering system of claim 14 including a remote control having a manually operable keyboard and a human readable screen enabling said remote control of said time duration and said frequency for effecting a watering interval.

16. An automatic pilot for managing the operation of an associated valve by way of selective on-site or remote control of said automatic pilot, said automatic pilot comprising:

a coupling for physically attaching said automatic pilot in operative managing relation to an associated valve;

a bistable actuator that is movable between a stable valve-closed position and a stable valve-open position, to thereby respectively close or open the associated valve;

first force means associated with said actuator for biasing said actuator to a first of said stable positions;

second force means associated with said actuator for biasing said actuator to a second of said stable positions;

an electrically energizable coil associated with said bistable actuator;

electrical circuit means for selectively pulse energizing said coil;

said circuit means being selectively controllable to pulse energize said coil in a first manner in order to overcome said biasing of said actuator to said first stable position;

said circuit means being selectively controllable to pulse energize said coil in a second manner that is opposite to said first manner in order to overcome said biasing of said actuator to said second stable position;

to thereby selectively cause said actuator to move between said first and second stable positions;

first control means enabling an on-site control input to said circuit means; and second control means enabling a remote control input to said circuit means from a remote location.

17. The automatic pilot of claim 16 wherein:

said first force means is a permanent magnet;

said second force means is a spring;

said actuator is magnetically permeable;

said first stable position is a valve-open position in which a small air gap exists between said permanent magnet and said actuator; and said second stable position is a valve-closed position in which a large air gap exists between said permanent magnet and said actuator.

18. The automatic pilot of claim 17 including safety means operable to cause said actuator to assume said valve-closed position.

* * * * *